Figure 1:
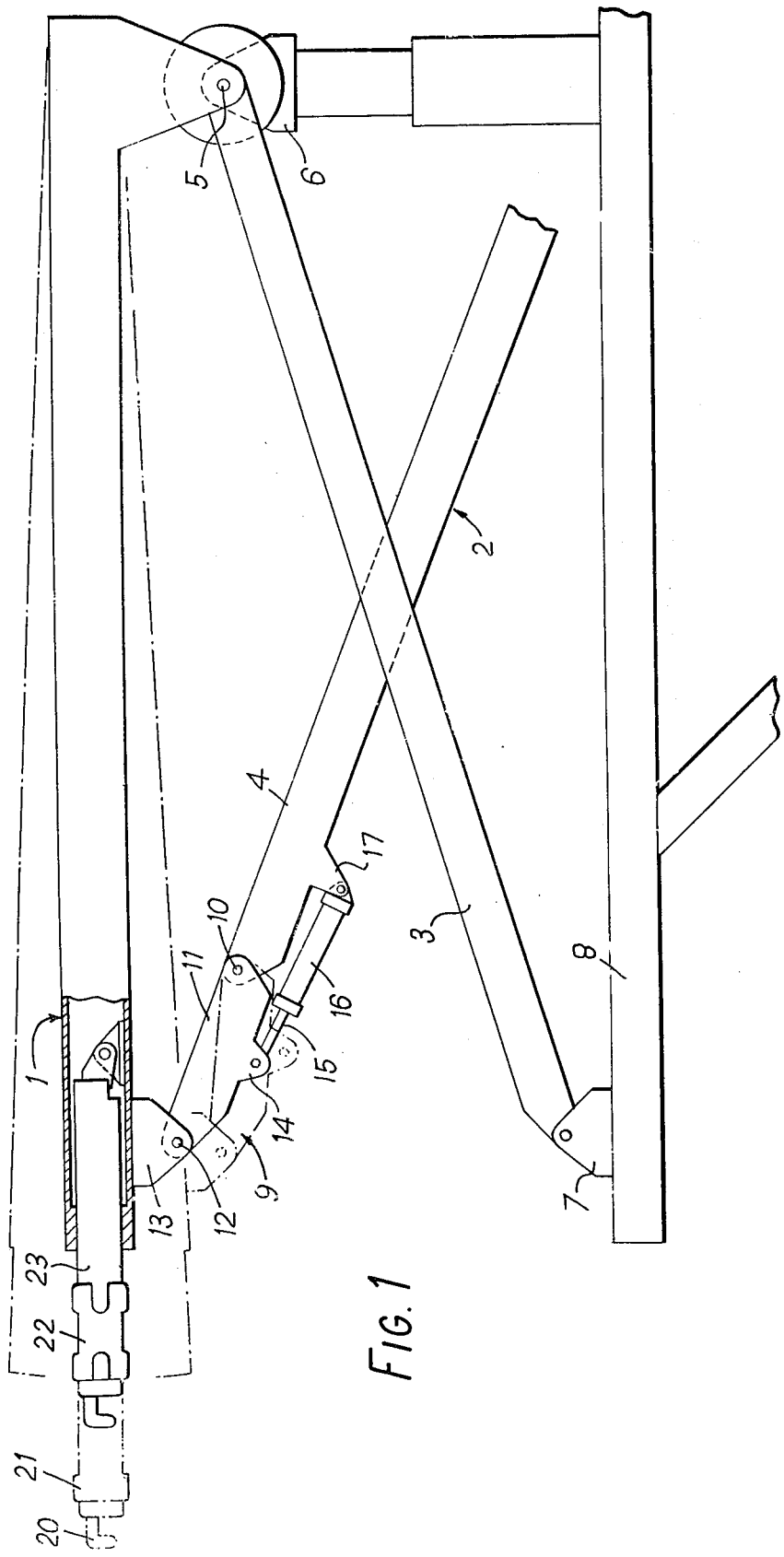

United States Patent [19]
Jones

[11] 3,988,006
[45] Oct. 26, 1976

[54] CARGO LOADING VEHICLES

[75] Inventor: Rodney Vernon Jones, Rochford, England

[73] Assignee: Atel Products Limited, Southend-on-Sea, England

[22] Filed: Apr. 15, 1975

[21] Appl. No.: 568,294

[30] Foreign Application Priority Data
Apr. 18, 1974 United Kingdom............... 17132/74
Apr. 18, 1974 United Kingdom............... 17133/74

[52] U.S. Cl. .............................................. 254/124
[51] Int. Cl.² ........................................ B66F 3/00
[58] Field of Search ............ 254/2 R, 2 C, 3 R, 3 C, 254/8 R, 8 C, 9 R, 9 C, 10 R, 10 C, 89 H, 122, 124; 214/38 R, 38 B, 38 BA, 38 BB

[56] References Cited
UNITED STATES PATENTS
2,797,833  7/1957  Cash ................................... 214/512

| | | |
|---|---|---|
| 2,929,519 | 3/1960 | Taylor................................. 254/9 C |
| 3,259,255 | 7/1966 | Cresci ................................. 254/3 C |
| 3,454,173 | 7/1969 | Martin ............................. 214/38 C |
| 3,599,262 | 8/1971 | Carder............................. 214/38 BA |

FOREIGN PATENTS OR APPLICATIONS
211,399   4/1956  Australia............................. 214/512
834,129   3/1952  Germany ........................ 214/38 BB
193,895   1/1965  Sweden................................ 254/124

*Primary Examiner*—Al Lawrence Smith
*Assistant Examiner*—Robert C. Watson
*Attorney, Agent, or Firm*—Lon H. Romanski

[57] ABSTRACT

A cargo loading vehicle which has a lifting platform for raising cargo to an aircraft door. The platform is raised by means of a scissor lift which incorporates a knuckle joint in each of the scissor legs. The knuckle joints can be pivoted independently under power which adjusts the level of the platform.

14 Claims, 3 Drawing Figures

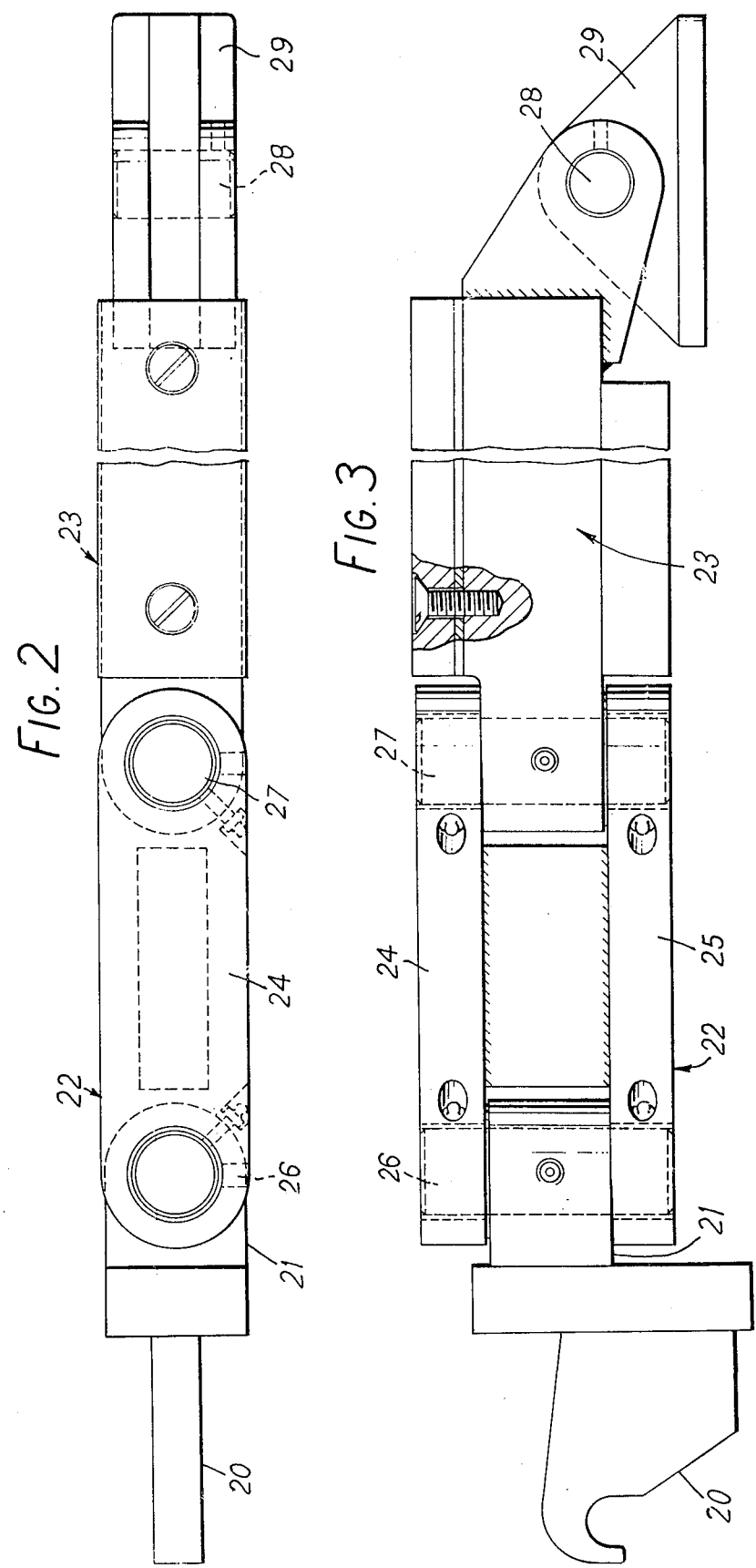

CARGO LOADING VEHICLES

This invention relates to cargo loading vehicles and is more particularly although not exclusively concerned with a vehicle which is suitable for loading aircraft.

It is to be understood that the term loading has been used herein to refer to vehicles which are used not only for loading but unloading.

When such vehicles are maneuvered to be adjacent an aircraft it sometimes occurs that the level of the aircraft and that of the platform which is raised to a height adjacent the door of the aircraft are not the same and are angularly disposed with respect to one another. This causes difficulties in the movement of goods between the aircraft and the platform and it is an object of the present invention to overcome this drawback.

According to the present invention a cargo loading vehicle comprises a lifting platform and a scissor lift assembly for raising and lowering the platform, and means on the scissor lift assembly for adjusting the level of the platform.

In one preferred construction the means comprises a knuckle joint on a leg of the scissor lift assembly. With this arrangement the length of the scissor lift can effectively be adjusted.

The knuckle joint is conveniently mounted on the upper end of the leg and preferably comprises a link pivoted between a member on the underside of the platform and the scissor leg.

The knuckle joint may be operated by an extensible and retractable mechanism connected between it and the scissor leg, conveniently a hydraulic ram.

Although adjustment may be possible with one knuckle joint preferably two knuckle joints are provided respectively mounted in the same position on separate scissor legs.

The member to which the knuckle joint is connected is preferably mounted for captive and slidable movement in the platform, and conveniently the member slides in a T section slot mounted on the underside of the platform.

The platform preferably also includes means for latching onto an aircraft and the latching means is conveniently mounted to be relatively movable in the plane of the platform. The latching means may conveniently be mounted in the forward end of a subsidiary support member which is mounted for relative sliding movement forwardly and rearwardly with respect of the platform and the subsidiary support member may be linked by pivotal links to a second support member which is itself slidable forwardly and rearwardly with respect to the platform.

The second support member may be pivoted adjacent its rear end and this enables an operator to lift the latch means so that they can readily be latched onto the aircraft.

With the latching means it may not be necessary to warp the platform and in this case the member to which the knuckle joint is connected may not be held captive and when latched the scissors can drop away.

The invention may be performed in various ways:- and one specific embodiment will now be described by way of example with reference to the accompanying drawings in which:

FIG. 1 is a diagramatic elevation of a cargo loading vehicle according to the present invention, FIG. 2 is a plan view of one end of the latch mechanism and, FIG. 3 is an elevation of FIG. 2.

In the arrangement shown in the Figures a platform indicated generally at 1 is mounted on a scissor lift 2 comprising on each side of the platform, scissor legs 3 and 4 the scissor leg 3 being pivoted at 5 to the platform on a pivot axle upon which also acts the upper end of a hydraulic ram 6 which serves to raise and lower the pivot point 5 and hence the platform 1. The other end of the scissor leg 3 is mounted in a sliding pivot 7 which slides in a guide (not shown) on a base 8.

The other pivot leg 4 is pivoted at the rear to a pivot (not shown) disposed vertically below the pivot point 5 whilst the upper end of the leg includes a knuckle joint indicated generally at 9 and which is pivoted at 10 to a link 11 which is pivoted at 12 to a member 13 which slides in a T-shaped slot (not shown) on the underside of the platform 1.

The link 11 has a lug 14 on its underside to which is pivoted one end 15 of a hydraulic ram 16 the other end of which is pivoted at 17 to the scissor leg 4.

With the apparatus described above it is possible to alter the level of the front of the platform with respect to the rear by actuation of the hydraulic ram 16. In addition it is possible to twist the platform as it is torsionally flexible within certain limits. This can be achieved by actuation of one or both hydraulic rams which respectively pull or push the members 13 in their T-shaped slots which cause the platform to twist with relative movement of the rams 16 on the respective legs 4. When the rams are actuated in tandem the platform rotates about the rear pivot point 5 and the front can be raised or lowered with respect to this rear pivot point. Thus within the limits set by the torsional flexibility of the platform and the length of the slots in which the members 13 slide the platform can be adjusted appropriately. Thus the platform can be levelled with respect to the aircraft as it or the vehicle could be on a slope. Thus the platform can take up the pitch or roll attitude of an aircraft without latching on to the aircraft.

However it may also be desirable to latch on to an aircraft and in this case the forward end of the platform is provided with a series of hooks such as shown at 20 in FIG. 1 which are arranged to latch on to fixings, as, for example, pins, on the base of the floor or on the door sill of the aircraft, which pins may be used for retaining the door in place. The hooks 20 are disposed at the forward end of a supporting member 21 which extends along the width of the platform and which is pivotally connected by link members 22 to a second support member 23. The link members 22 are shown more clearly in FIGS. 2 and 3 and comprise upper and lower bars 24 and 25 which have pivot pins 26 and 27 respectively connected to the support members 21 and 23. The support member 23 extends rearwardly into the front of the platform 1 and is pivoted at its rear end at 28 to a slide member 29 which permits relative sliding movement of the support member 23 with respect to the platform 1. There are two links 22 one on each side of the platform.

In operation the platform is moved to a position adjacent the aircraft and the hooks 20 fitted onto the pins on the aircraft. In this position it is not necessary to use the hydraulic rams 16 which may be rendered inoperative and the platform allowed to adopt freely the required attitude and if desired the members 13 may be allowed to drop away from the platform and the scissors lowered. If required however they may also be used to adjust the plane of the platform with respect to the aircraft. The pivots 28 allow relative sliding movement of the platform 1 with respect to the aircraft, the levels being adjusted either by the natural torsional flexibility of the platform or with the aid of the rams 16.

It will be appreciated that with the present invention the platform 1 can be adjusted and/or flexed with respect to the aircraft and this considerably eases the transference of goods by alignment of the transferring surfaces as well as if desired being latched to it. The vehicle may be a vehicle having two independently operable lifting platforms.

I claim:

1. A cargo loading vehicle, comprising a lifting platform, a scissor lift assembly for raising and lowering said platform, said scissor lift assembly comprising first and second pairs of scissor legs, said first pair of scissor legs comprising first and second scissor leg means effective for raising and lowering a first said of said platform, said second pair of scissor legs comprising third and fourth scissor leg means effective for raising and lowering a second side of said platform which second side is generally opposite to said first side, said first and second pairs of scissor legs being mounted for movement in unison and being so positioned as to have said first leg means generally corresponding to said third leg means, said first leg means comprising a first leg and further comprising first knuckle joint means, said third leg means comprising a third leg and further comprising second knuckle joint means, and additional separate means enabling each of said knuckle joint means to move independently of the other of said knuckle joint means and without attendent movement of said second and fourth leg means.

2. A cargo loading vehicle according to claim 1 wherein said first knuckle joint means is mounted on a upper end of said first leg.

3. A cargo loading vehicle according to claim 2 wherein said first knuckle joint means comprises a link pivoted between a member on an underside of said platform and said first leg.

4. A cargo loading vehicle according to claim 3 wherein said first knuckle joint means is operated by an extensible and retractable mechanism connected between said first knuckle joint means and said first leg.

5. A cargo loading vehicle according to claim 4 wherein said extensible and retractable mechanism comprises a hydraulic ram.

6. A cargo loading vehicle according to claim 3 wherein said member is mounted for captive and slidable movement in said platform.

7. A cargo loading vehicle according to claim 6 wherein said member slides in a T-section slot mounted on said underside of said platform.

8. A cargo loading vehicle according to claim 1 wherein said first and second knuckle joint means are respectively mounted in the same positions on the respective first and second pairs of scissor legs.

9. A cargo loading vehicle according to claim 1 wherein said platform includes latching means for latching onto an aircraft.

10. A cargo loading vehicle according to claim 9 wherein said latching means are mounted to be relatively moveable in the plane of said platform.

11. A cargo loading vehicle according to claim 9 wherein said latching means are mounted on a forward end of a subsidiary support member, and wherein said subsidiary support member is mounted for relatively sliding movement forwardly and rearwardly with respect to said platform.

12. A cargo loading vehicle according to claim 11 wherein said subsidiary support member is linked by pivotal links to a second support member, and wherein said second support member is slidable forwardly and rearwardly with respect to said platform.

13. A cargo loading vehicle according to claim 12 wherein said second support member is pivoted adjacent its rear end.

14. A cargo loading vehicle according to claim 6 wherein said member is mounted for captive and slidable movement in said platform, wherein said member slides in a T-section slot mounted on said underside of said platform, wherein said knuckle joint means are respectfully mounted in the same positions on the respective first and second pairs of scissor legs, wherein said platform includes latching means for latching onto an aircraft, wherein said latching means is mounted on a forward end of a subsidiary support member, said subsidiary support member being mounted for relatively sliding movement forwardly and rearwardly with respect to said platform, wherein said subsidiary support member is linked by pivotal links to a second support member, and wherein said second support member is slidable forwardly and rearwardly with respect to said platform.

* * * * *